United States Patent Office 3,312,682
Patented Apr. 4, 1967

3,312,682
AZO AND ANTHRAQUINONE DYES CONTAINING ALKOXALYL AND ARYLOXALYL MONO- AND DIESTERS OF o- AND p-DIHYDROXYPHENYL GROUPS
Myron S. Simon, Newton Center, and Stanley H. Mervis, Newton Highlands, Mass., assignors to Polaroid Corporation, Cambridge, Mass., a corporation of Delaware
No Drawing. Filed Dec. 27, 1965, Ser. No. 516,785
2 Claims. (Cl. 260—202)

The present application is a continuation-in-part of our copending U.S. application Ser. No. 813,701, filed May 18, 1959, and now U.S. Patent No. 3,230,084, which is in turn a continuation-in-part of our copending application Ser. No. 697,808, filed Nov. 21, 1957 (now abandoned).

This invention relates to chemistry and more particularly to novel dyes particularly useful in photographic products and processes for the development of photosensitive silver halide elements.

It is a primary object of the present invention to provide a novel hydrolyzable derivative of dye developers, said hydrolyzable derivatives being initially nonreactive with an associated photosensitive silver halide emulsion and rendered reactive by hydrolysis occurring during processing.

A still further object of the present invention is to provide novel hydrolyzable derivatives of dye developers, which derivatives comprise the hydrolyzable alkoxalyl and aryloxalyl esters of specified dye developers.

Other objects of the invention will in part be obvious and will in part appear hereinafter.

The invention accordingly comprises the several steps and the relation and order of one or more of such steps with respect to each of the others, and the products possessing the features, properties and the relation of elements which are exemplified in the following detailed disclosure, and the scope of the application of which will be indicated in the claims.

For a fuller understanding of the nature and objects of the invention, reference should be had to the following detailed description.

The compounds of the present invention possess the properties of both a dye and, during the photographic processes herein disclosed, a developing agent; thus they may be referred to as dye developer precursors. The nature of these dye developer precursors will be described hereinafter.

The dye developer precursors of this invention are particularly useful in the diffusion transfer processes described in our aforementioned U.S. patent applications, Ser. Nos. 813,701 and 697,808, and in the copending application of Edwin H. Land and Howard G. Rogers, Ser. No. 194,359, filed May 14, 1962, and now U.S. Patent No. 3,230,082 as a continuation-in-part of Ser. No. 669,542, filed July 2, 1957 (now abandoned), which disclose diffusion-transfer processes wherein a photographic negative material such as a photographic element comprising an exposed silver halide emulsion layer is processed to impart to an image-receiving element a positive dye image, the photosensitive element containing at least one dye developer in the form of a hydrolyzable derivative. It is an object of this invention to provide compounds suitable for use in such processes. Details of the photographic use of the instant novel compounds may be found in the aforementioned patent applications, and said disclosures are hereby incorporated herein by reference.

The dye developer precursors of the present invention comprise dyes, preferably azo or anthraquinone dyes, characterized in that they contain not less than one and not more than two groups selected from the group consisting of the alkoxalyl and aryloxalyl mono- and diesters of ortho- and para-dihydroxyphenyl groups.

The last-mentioned novel hydrolyzable dye developer derivatives also may be represented by the formula:

$$D(-Y-Z)_a$$

wherein D represents a dye system, that is, a chromophoric system, preferably an azo or anthraquinone chromophoric system; Y is a covalent bond or a divalent radical; $a$ is 1 or 2; and Z is a group selected from the group consisting of the alkoxalyl and aryloxalyl mono- and diesters of ortho- and para-dihydroxyphenyl groups.

As examples of divalent radicals, signified by the term Y, suitable for use in the practice of the present invention, mention may be made of: divalent organic radicals such as alkylene or alkyleneamino radicals, the alkylene groups being preferably lower alkylene radicals such as ethylene, isopropylene, etc.; sulfonamido; sulfamyl; carboxamido; carbamyl; arylene radicals such as phenylene, etc.; araldkylene radicals such as phenethyl, etc.; acyl radicals such as

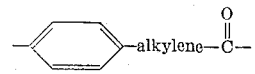

etc.; thio radicals such as

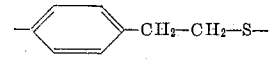

etc.; oxy radicals such as

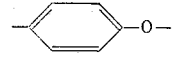

etc.; sulfonyl radicals such as

etc.; and the like.

Preferred divalent radicals, within the above-mentioned grouping comprise lower alkylene radicals, preferably containing from 1 to 5 carbon atoms, such as ethylene, n-propylene, isopropylene, and the like; lower alkylene amino radicals; carboxamido radicals, such as lower alkylenecarboxamido radicals, for example, methylenecarboxamido, ethylenecarboxamido, and the like.

In the anthraquinone dye developers of our invention the divalent radical above-mentioned is preferably attached directly to a nuclear carbon of said anthraquinone nucleus, and is also attached directly to a nuclear carbon of the phenyl ring of the oxalyl ester developing function, e.g., the nitrogen atom of a lower alkylene amino group is bonded to a nuclear carbon of the anthraquinone nucleus and a carbon is bonded to a ring carbon of a hydroquinonyl radical.

Preferred dye developers may be represented by the formula:

$$D^1(-Y^1-Z)_a$$

wherein Z and $a$ possess the same significance as previously denoted; $Y^1$ represents an alkylene, alkylenamino, or alkylenecarboxamido radical, wherein said alkylene radical comprises a lower alkylene radical and said alkylene radical is directly attached to a nuclear carbon atom of the phenyl ring of said Z and said $Y^1$ is additionally directly attached to a nuclear carbon atom of an aromatic ring of $D^1$; and $D^1$ represents the nonmetallic atoms necessary to complete a monoazo or anthraquinone dye.

The term "dihydroxyphenyl" as used herein is intended to include the nuclear substituted derivatives thereof, especially the nuclear substituted alkyl and halogen derivatives thereof. Where desired, the phenyl nucleus may be substituted by additional substituents, that is, radicals so situated as not to impair the respective silver halide developing function of the phenyl group when said group is subjected to hydrolysis by the photographic processing composition.

The novel dyes of the present invention may be prepared by reacting a dye developer, preferably an azo or anthraquinone dye developer, having not less than one and preferably not more than two ortho-dihydroxyphenyl or para-dihydroxyphenyl groups or nuclear substituted derivatives thereof with an alkyl and/or an aryl oxalyl halide such as an oxalyl bromide or chloride, preferably an oxalyl chloride. Where the dye developer has additional available reactive hydroxyl groups, or free amine groups, reaction may occur at such additional groups.

The variance of the mole ratios of reactants, that is, the mole ratios of the respective oxalyl halide to dye developer molecule provides either the desired mono- or bis-esters of the dihydroxybenzene nuclei or mixtures thereof. A decrease in the mole ratio of the respective oxalyl halide to dye developer molecule effects an increased formation of the mono-ester.

In the preferred embodiment, the dye molecule is devoid of aliphatic alcohol groups, which, if present during the synthesis of the novel compounds of this invention, would preferentially esterify and thus interfere with the esterification of the dihydroxy groups of the benzene nucleus. It should be clear however, that it is within the scope of this invention to esterify such alcohol groups in addition to the dihydroxy groups of the benzene nucleus.

The synthesis preferably is effected in a reaction medium comprising a suitable anhydrous halogen acid acceptor, e.g., pyridine, quinoline, etc. The particular conditions, i.e., temperature, etc., will vary according to the oxalyl halide and the halogen acid acceptor utilized, e.g., the reaction is preferably performed on a steam bath, but it is within the scope of this invention to employ a temperature ranging from a lower temperature such as room temperature to the highest temperature at which the substituted oxalyl halide and dye molecule are stable.

The preparations of numerous of the dye developers preferred for use in synthesizing dye developer precursors of the present invention are set forth in the following copending U.S. applications:

Ser. No. 445,171, filed July 22, 1954, in the name of Richard S. Corley, now abandoned;

Ser. No. 449,514, filed Aug. 12, 1954, in the names of Elkan R. Blout and Myron S. Simon, now abandoned;

Ser. No. 471,542, filed Nov. 26, 1954, in the names of Elkan R. Blout, Saul G. Cohen, Milton Green, Howard G. Rogers, Myron S. Simon, and Robert B. Woodward, now abandoned, the subject matter of which has been incorporated in Ser. No. 1,442 and Ser. No. 1,443, both filed Jan. 11, 1960, the former in turn now abandoned, the subject matter of which has been incorporated in Ser. No. 401,714, filed Oct. 5, 1964;

Ser. No. 473,458, filed Dec. 6, 1954, in the names of Elkan R. Blout, Saul G. Cohen, Milton Green, and Myron S. Simon (now U.S. Patent No. 3,077,402, issued Feb. 12, 1963);

Ser. No. 478,922, filed Dec. 30, 1954, in the names of Elkan R. Blout, Marilyn R. Cohler, Milton Green, Myron S. Simon and Robert B. Woodward, now abandoned, the subject matter of which has been incorporated in Ser. No. 824,785 and Ser. No. 824,786, both filed July 3, 1959, now abandoned, the subject matters of which have been incorporated in, respectively, Ser. No. 233,461, filed Oct. 26, 1962 (now U.S. Patent No. 3,135,606, issued June 2, 1964), and Ser. No. 318,827, filed Oct. 25, 1963, and now U.S. Patent No. 3,209,016;

Ser. No. 485,342, filed Jan. 31, 1955, in the name of Richard S. Corley (now U.S. Patent No. 2,983,605, issued May 9, 1961);

Ser. No. 485,840, filed Feb. 3, 1955, and now U.S. Patent No. 3,255,001, in the names of Elkan R. Blout and Howard G. Rogers;

Ser. No. 521,874, filed July 13, 1955, in the names of Elkan R. Blout, Milton Green, Myron S. Simon, and Howard G. Rogers, now abandoned, the subject matter of which has been incorporated in Ser. No. 799,427, filed Mar. 16, 1959 (now U.S. Patent No. 3,076,820, issued Feb. 5, 1963);

Ser. No. 522,848, filed July 18, 1955, in the names of Elkan R. Blout, Sydney Kasman and Myron S. Simon, now abandoned, the subject matter of which has been incorporated in Ser. No. 799,425, filed Mar. 16, 1959 (now U.S. Patent No. 3,076,808, issued Feb. 5, 1963);

Ser. No. 612,045, filed Sept. 25, 1956, in the names of Elkan R. Blout, Milton Green and Howard G. Rogers, now abandoned, the subject matter of which has been incorporated in Ser. No. 144,816, filed Oct. 18, 1961 (now U.S. Patent No. 3,134,672, issued May 26, 1964);

Ser. No. 612,052, filed Sept. 25, 1956, in the names of Milton Green and Howard G. Rogers, now abandoned, the subject matter of which has been incorporated in Ser. No. 165,930, filed Jan. 12, 1962 (now U.S. Patent No. 3,135,604, issued June 2, 1964);

Ser. No. 612,053, filed Sept. 25, 1956, in the name of Myron S. Simon, now abandoned, the subject matter of which has been incorporated in Ser. No. 196,523 and Ser. No. 196,524, both filed May 21, 1962 (the former now U.S. Patent No. 3,183,089, issued May 11, 1965, the latter now U.S. Patent No. 3,134,765, issued May 26, 1964);

Ser. No. 612,054, filed Sept. 25, 1956, in the names of Helen P. Husek and Myron S. Simon, now abandoned, the subject matter of which has been incorporated in Ser. No. 197,259 and Ser. No. 197,283, both filed May 24, 1962, (the former now U.S. Patent No. 3,134,763, issued May 26, 1964, the latter now U.S. Patent No. 3,236,645);

Ser. No. 612,055, filed Sept. 25, 1956, in the name of Helen P. Husek, now abandoned, the subject matter of which has been incorporated in Ser. No. 192,354 and Ser. No. 192,355, both filed May 4, 1962 (the former now U.S. Patent No. 3,134,762, issued May 26, 1964, the latter now U.S. Patent No. 3,236,643);

Ser. No. 663,905, filed June 6, 1957, in the names of Milton Green and Howard G. Rogers, now abandoned, the subject matter of which has been incorporated in Ser. No. 193,293 and Ser. No. 193,326, both filed May 8, 1962, (the former now U.S. Patent No. 3,173,906, issued Mar. 16, 1955, and the latter now U.S. Patent No. 3,222,169);

Ser. No. 669,969, filed July 5, 1957, in the name of Milton Green, now abandoned;

Ser. No. 678,439, filed Aug. 15, 1957, in the name of Myron S. Simon, now abandoned, the subject matter of which has been incorporated in Ser. No. 232,584 and Ser. No. 232,585, both filed Oct. 23, 1964 (the former now U.S. Patent No. 3,131,061, issued Apr. 28, 1964, the latter now U.S. Patent No. 3,255,206);

Ser. No. 680,403, filed Aug. 26, 1957, in the name of Milton Green, now abandoned, the subject matter of which has been incorporated in Ser. No. 316,498, filed Oct. 16, 1963, and now abandoned;

Ser. No. 680,434, filed Aug. 26, 1957, in the name of Milton Green, now abandoned, the subject matter of which has been incorporated in Ser. No. 230,287 and Ser. No. 230,288, both filed Oct. 12, 1962 (the former now U.S. Patent No. 3,230,086 and the latter now U.S. Patent No. 3,218,312);

Ser. No. 680,437, filed Aug. 26, 1957, in the names of Elkan R. Blout and Myron S. Simon (now U.S. Patent No. 3,047,386, issued July 31, 1962);

Ser. No. 680,619, filed Aug. 27, 1957, in the names of Elkan R. Blout and Myron S. Simon, now abandoned;

Ser. No. 685,081, filed Sept. 20, 1957, in the names of Elkan R. Blout, Milton Green, Howard G. Rogers, and Myron S. Simon, now abandoned, the subject matter of which has been incorporated in Ser. No. 222,656 and Ser. No. 222,702, both filed Sept. 10, 1962 (the former now U.S. Patent No. 3,142,565, issued July 28, 1964, and the latter now U.S. Patent No. 3,208,991);

Ser. No. 703,515, filed Dec. 18, 1957, in the name of Milton Green, now abandoned;

Ser. No. 707,109, filed Jan. 6, 1958, in the names of Elkan R. Blout, Milton Green, Howard G. Rogers and Robert B. Woodward, now abandoned;

Ser. No. 709,001, filed Jan. 15, 1958, in the names of Milton Green, Helen P. Husek and Sydney Kasman, now abandoned, the subject matter of which has been incorporated in Ser. No. 200,639, filed June 7, 1962, and now U.S. Patent No. 3,214,469;

Ser. No. 709,002, filed Jan. 15, 1958, in the names of Milton Green and Helen P. Husek, now abandoned, the subject matter of which has been incorporated in Ser. No. 75,128, filed Dec. 12, 1960 (now U.S. Patent No. 3,158,595, issued Nov. 24, 1964);

Ser. No. 709,005, filed Jan. 15, 1958, in the names of Sydney Kasman and Helen P. Husek, now abandoned, the subject matter of which has been incorporated in Ser. No. 75,127, filed Dec. 12, 1960, now abandoned, the subject matter of which has been incorporated in Ser. No. 339,615, filed Jan. 23, 1964;

Ser. No. 711,811, filed Jan. 29, 1958, in the name of Milton Green, now abandoned, the subject matter of which has been incorporated in Ser. No. 232,613, filed Oct. 23, 1962, and now U.S. Patent No. 3,246,985;

Ser. No. 748,145, filed July 14, 1958, in the names of Milton Green and Howard G. Rogers, now abandoned, the subject matter of which has been incorporated in Ser. No. 190,804, filed Apr. 27, 1962 (now U.S. Patent No. 3,186,982, issued June 1, 1965);

Ser. No. 755,804, filed Aug. 18, 1958, in the names of Elkan R. Blout, Saul G. Cohen, Milton Green, and Myron S. Simon, now abandoned;

Ser. No. 756,066, filed Aug. 20, 1958, in the name of Myron S. Simon, now abandoned;

Ser. No. 771,719, filed Nov. 4, 1958, in the names of Elkan R. Blout and Richard S. Corley, now abandoned, the subject matter of which has been incorporated in Ser. No. 193,320, filed May 8, 1962, and now U.S. Patent No. 3,236,864; and Ser. No. 788,893, filed Jan. 26, 1959, in the names of Milton Green and Myron S. Simon, now abandoned, the subject matter of which has been incorporated in Ser. No. 359,998, filed Apr. 15, 1964.

As examples of compounds contemplated within the scope of the present invention, mention may be made of the following:

I)
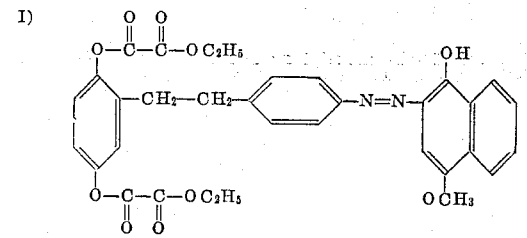

2-[p-(2',5'-bis-ethoxalyloxyphenethyl)-phenylazo]-4-methoxy-1-naphthol (II)
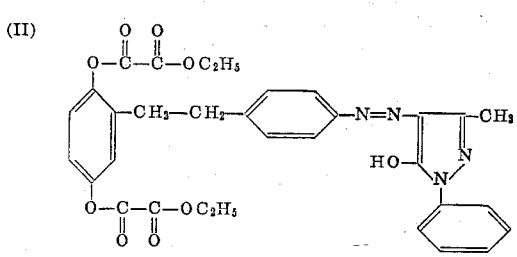

1-phenyl-3-methyl-4-[p-(2',5'-bis-ethoxalyloxyphenethyl)-phenylazo]-5-pyrazolone (III)
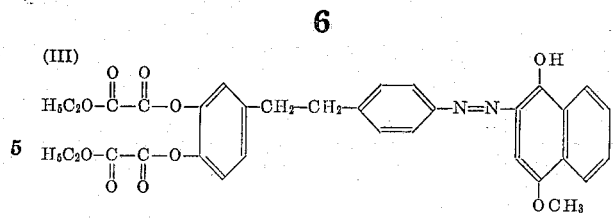

2-[p-(3',4'-bis-ethoxalyloxyphenethyl)-phenylazo]-4-methoxy-1-naphthol (IV)
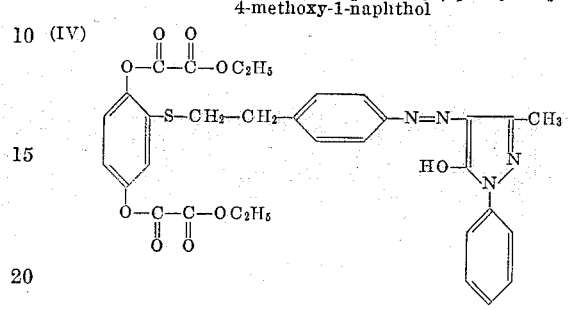

1-phenyl-3-methyl-4-[p-(2',5'-bis-ethoxalyloxyphenyl-thioethyl)-phenylazo]-5-pyrazolone (V)
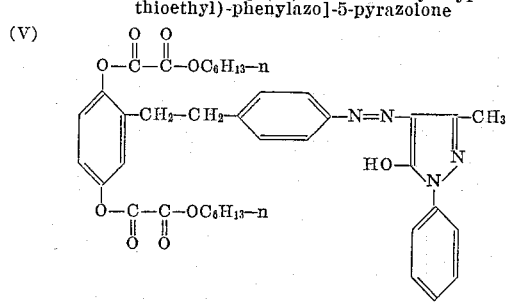

1-phenyl-3-methyl-4-[p-(2',5'-bis-n-hexoxalyloxyphenethyl)-phenylazo]-5-pyrazolone (VI)
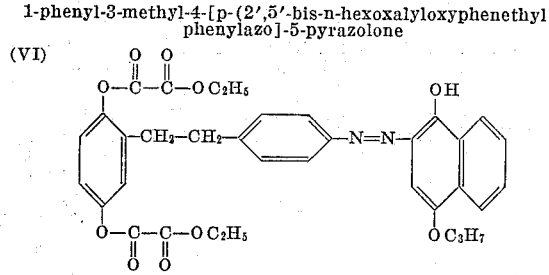

2-[p-(2',5'-bis-ethoxalyloxy-4'-methyl-phenethyl)-phenylazo]-4-n-propoxy-1-naphthol (VII)
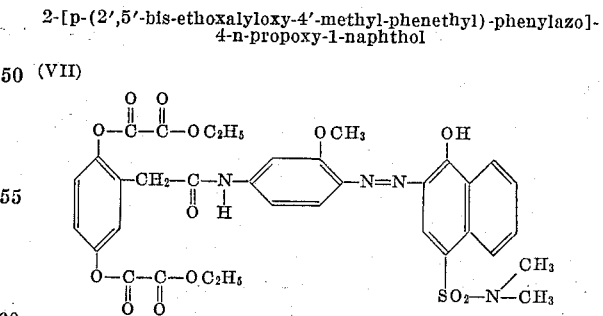

2-[4'(2'',5''-bis-ethoxalyloxyphenyl-acetamido)-2'-methoxy-phenylazo]-4-N,N-dimethylsulfamyl-1-naphthol (VIII)
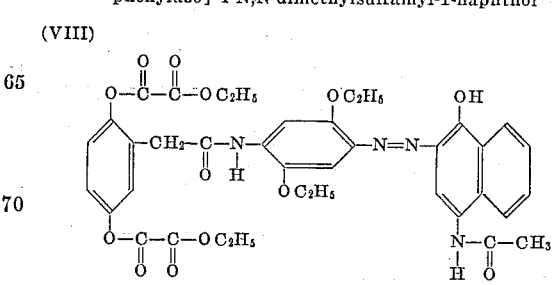

4-acetamido-2-[4'-(2'',5''-bis-ethoxalyloxyphenyl-acetamido)-2',5'-diethoxy-phenylazo]-1-naphthol (IX)

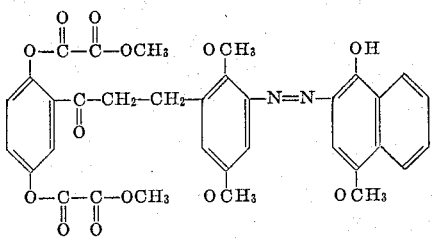

4-methoxy-2-[2′,5′-dimethoxy-3′-(2″-[2‴,5‴-bis-methoxal-yloxybenzoyl]-ethyl)-phenylazo]-1-naphthol (X)

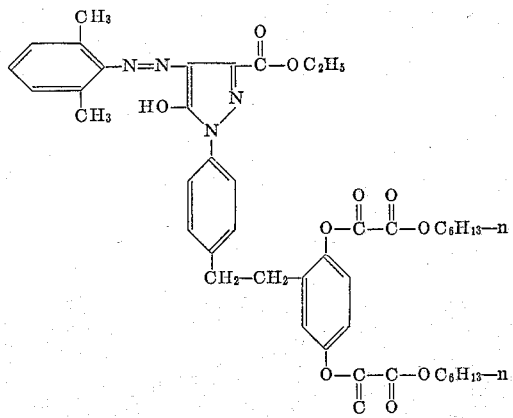

1-[4″-(2‴,5‴-bis-n-hexoxalyloxyphenethyl)-phenyl]-3-car-bethoxy-4-(2′,6′-dimethyl-phenylazo)-5-pyrazolone (XI)

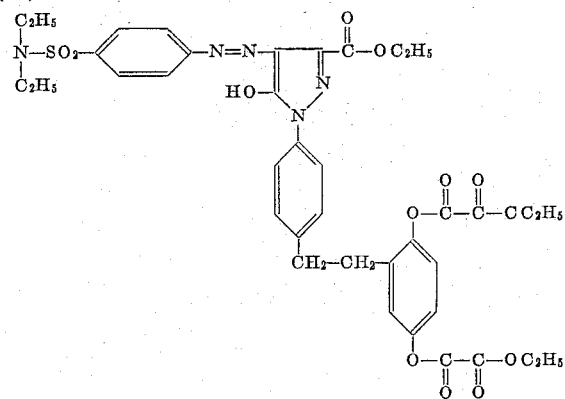

1-[4″-(2‴,5‴-bis-ethoxalyloxyphenethyl)-phenyl]-3-carbeth-oxy-4-(4′-N,N-diethylsulfonamidophenylazo)-5-pyrazolone (XII)

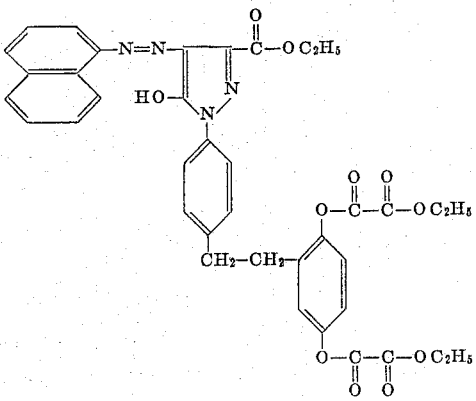

1-[4″-2‴,5‴-bis-ethoxalyloxyphenethyl)-phenyl]-3-car-bethoxy-4-(1′-naphthylazo)-5-pyrazolone (XIII)

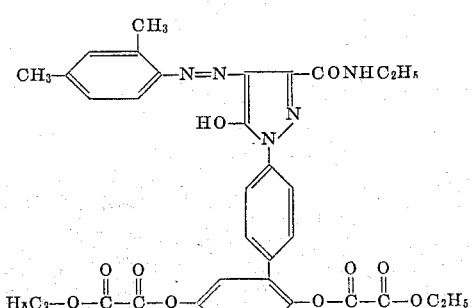

1-[4″-(2‴,5‴-bis-ethoxalyloxyphenyl)-phenyl]-3-N-ethylcar-bamyl-4-(2′,4′-dimethylphenylazo)-5-pyrazolone (XIV)

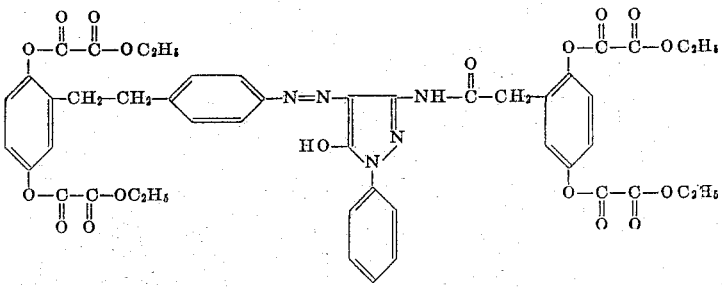

1-phenyl-3-[2′,5′-bis-ethoxalyloxyphenyl acetamido]-4-[p-2″,5″-bis-ethoxalyloxyphenethyl)-phenylazo]-5-pyrazolone (XV)

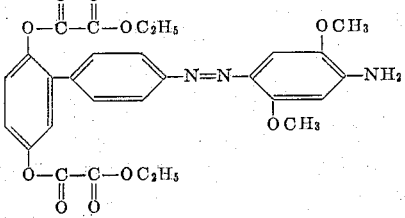

4-[p-(2′,5′-bis-ethoxalyloxyphenyl)-phenylazo]-2,5-dimethoxyaniline (XVI)

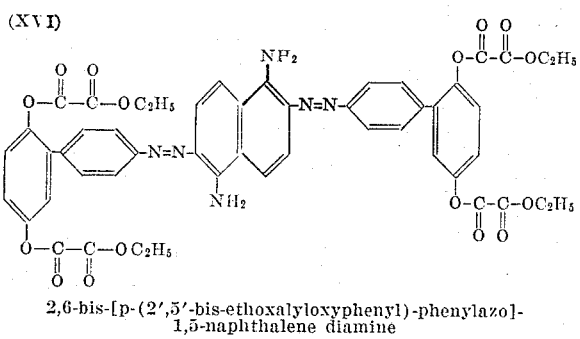

2,6-bis-[p-(2',5'-bis-ethoxalyloxyphenyl)-phenylazo]-1,5-naphthalene diamine (XVII)

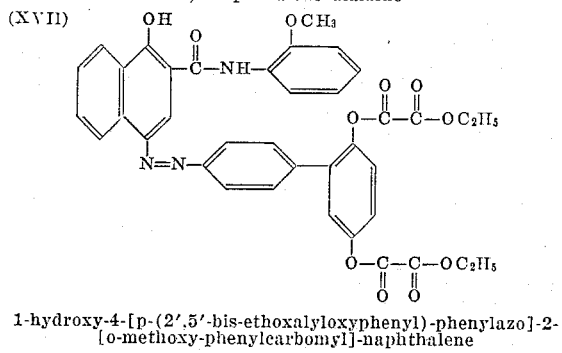

1-hydroxy-4-[p-(2',5'-bis-ethoxalyloxyphenyl)-phenylazo]-2-[o-methoxy-phenylcarbomyl]-naphthalene (XVIII)

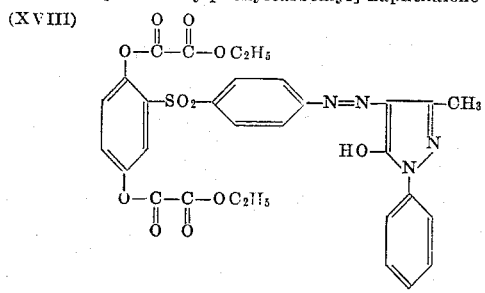

1-phenyl-3-methyl-4-[p-(2',5'-bis-ethoxalyloxyphenylsulfonyl)-phenylazo]-5-pyrazolone (XIX)

1,4-diamino-N-(β-2',5'-bis-ethoxalyloxyphenyl-α-methyl-ethyl)-2,3-anthraquinone dicarboxamide (XX)

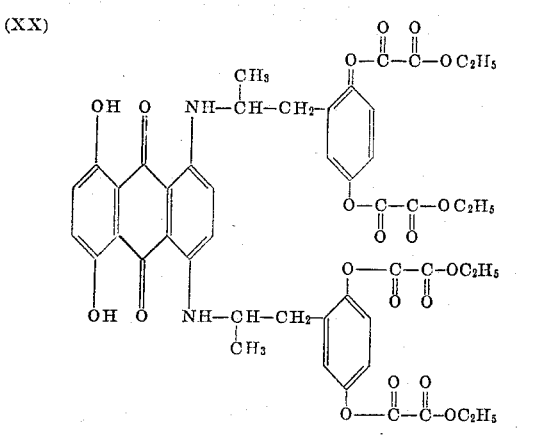

1-(α-methyl-propylamino)-4-(α-methyl-β-[2',5'-bis-ethoxalyloxyphenyl]-ethylamino)-anthraquinone (XXI)

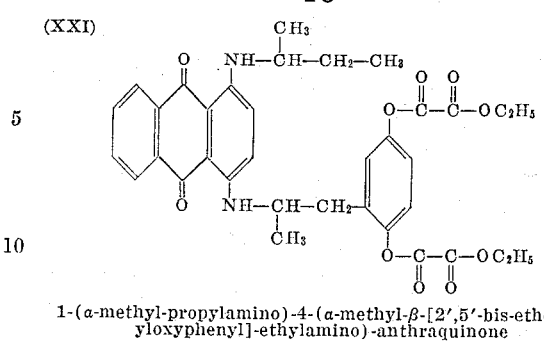

1-(α-methyl-propylamino)-4-(α-methyl-β-[2',5'-bis-ethoxalyloxyphenyl]-ethylamino)-anthraquinone (XXII)

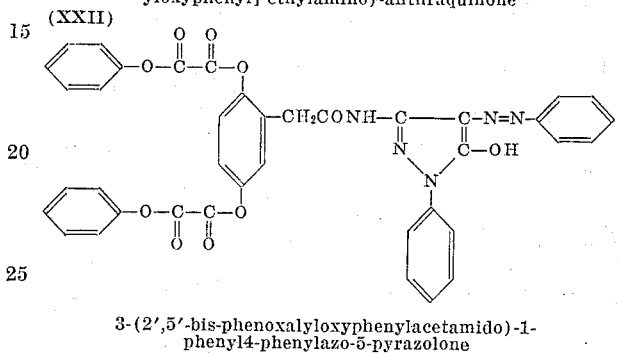

3-(2',5'-bis-phenoxalyloxyphenylacetamido)-1-phenyl4-phenylazo-5-pyrazolone

The invention will be illustrated in greater detail in conjunction with the following specific examples which set out a representative preparation and photographic utilization of the novel compounds of this invention, which, however, are not limited to the details therein set forth and are intended to be illustrative only.

Example 1

2 - [p - (2',5'-dihydroxyphenethyl)-phenylazo]-4-methoxy-1-naphthol (1 mol) is dissolved in dioxane by refluxing in a nitrogen atmosphere. Pyridine (2 mols) is added to the resultant solution. Ethoxalyl chloride (2 mols) is then added and the resultant mixture refluxed for 1 to 3 hours. The solvent is removed in vacuo, the residue washed with ice water and dried either in a vacuum oven at 60° C. or in a vacuum dessicator containing a dehydrating agent such as potassium hydroxide. The infrared absorption curve of the resultant product, 2-[p-2',5' - bis - ethoxalyloxyphenethyl) - phenylazo] - 4-methoxy-4-1-naphthol, Formula 1, in chloroform, exhibits ester bands at 1751 and 1772 cm.$^{-1}$. An infrared spectrum of the bis-ethoxalyl ester of hydroquinone exhibits ester bands at 1750 and 1775 cm.$^{-1}$, thus confirming the presence of the ethoxalyl ester groups in the above product.

Example 2

A photosensitive element is prepared by coating a gelatin-coated film base with a solution containing 4% of 2 - [p - (2',5'- bis - ethoxalyloxyphenethyl)-phenylazo]-4-methoxy-1-naphthol (Formula I as prepared in Example 1), in a 4% solution of cellulose acetate hydrogen phthalate in a 50:50 mixture, by volume, of acetone and tetrahydrofuran. After this coating has dried, a silver iodobromide emulsion is applied. This photosensitive element is exposed and processed by spreading an aqueous liquid processing composition comprising:

| | Percent |
|---|---|
| Sodium carboxymethyl cellulose | 5.0 |
| 1-phenyl-3-pyrazolidone | 0.2 |
| Sodium hydroxide | 3.0 |
| Potassium bromide | 0.2 | between said photosensitive element and an image-receiving element as said elements are brought into superposed relationship. The image-receiving element comprises a cellulose acetate-coated baryta paper which has been coated with a solution comprising 10% N-methoxymethyl polyhexamethylene adipamide in 80% aqueous ethanol.

After an imbibition period of approximately 1 minute, the image-receiving element is separated and contains a magenta positive dye image of the photographed subject.

The esterification technique disclosed in Example 1 is generally suitable for the preparation of any of the hydrolyzable azo and anthraquinone dye developers of our invention. For example, Compound VII may be prepared by the reacting 1 mole 2-[4'-(2'',5''-dihydroxyphenyl - acetamido) - 2' - methoxyphenylazo] - 4 - N,N-dimethylsulfamyl-1-naphthol in a suitable solvent solution with 2 mols of ethoxalyl chloride. Compound IX may be prepared by reacting 1 mol of 4-methoxy-2-[2',5'-dimethoxy - 3' - (2''-[2''',5'''-dihydroxybenzoyl]-ethyl)-phenylazo]-1-naphthol with 2 mols of methoxalyl chloride. Compound X can be prepared by reacting 1 mol of 1-[4''-(2''',5''' - dihydroxyphenethyl) - phenyl] - 3 - carbethoxy - 4 - (2',6'-dimethylphenylazo)-5-pyrazolone with 2 mols of n-hexoxalyl chloride.

It will be apparent that the selection of particular dye developers to be esterified in accordance with this invention is one of choice, determined primarily by the ultimate color desired in the photographic or other use, thus, substantially any of the many known dye developers may be used as starting materials.

The hydrolyzable compounds of this invention are particularly useful because their relative hydrolysis rate is such that they are stable to hydrolysis in the photosensitive element prior to application of an alkaline processing solution, and rapidly hydrolyzed thereafter, so as to form color images in very short processing times, i.e., one minute.

Since certain changes may be made in the above products and processes without departing from the scope of the invention herein involved, it is intended that all matter contained in the above description shall be interpreted as illustrative and not in a limiting sense.

What is claimed is:
1. A dye of the formula:

$$D(-Y-Z)_a$$

wherein Z represents a radical selected from the group consisting of the alkoxalyl and aryloxalyl mono- and di-esters of ortho- and para-dihydroxyphenyl groups, wherein the alkyl group of said alkoxalyl radical comprises a lower alkyl group and the aryl group of said aryloxalyl group comprises a phenyl group; Y represents an alkylene, alkyleneamino, or alkylenecarboxamido radical, wherein said alkylene radical is a lower alkylene radical and said alkylene radical is directly attached to a nuclear carbon atom of the phenyl ring of said Z and Y is additionally directly attached to a nuclear carbon atom of an aromatic ring of D; $a$ represents an integer from 1 to 2; and D represents a chromophoric system selected from the group consisting of azo and anthraquinone chromophoric systems.

2. 2 - [p - (2',5' - bis - ethoxalyloxyphenethyl) - phenylazo]-4-methoxy-1-naphthol.

No references cited.

CHARLES B. PARKER, *Primary Examiner.*

FLOYD D. HIGEL, *Assistant Examiner.*